United States Patent [19]

Tatsumi et al.

[11] Patent Number: 5,666,527
[45] Date of Patent: Sep. 9, 1997

[54] SYSTEM FOR DYNAMICALLY CHANGING LOGICAL DATA STRUCTURE OF DATABASE

[75] Inventors: Toshiharu Tatsumi; Hisayuki Enbutsu, both of Kawasaki, Japan

[73] Assignee: Fujitsu Limited, Kawasaki, Japan

[21] Appl. No.: 644,121

[22] Filed: May 10, 1996

Related U.S. Application Data

[63] Continuation of Ser. No. 128,147, Sep. 29, 1993, abandoned.

[30] Foreign Application Priority Data

Dec. 28, 1992 [JP] Japan .................................. 4-348404

[51] Int. Cl.⁶ ..................................................... G06F 17/30
[52] U.S. Cl. ........................................... 395/612; 395/613
[58] Field of Search ................................. 395/611, 612, 395/613

[56] References Cited

U.S. PATENT DOCUMENTS 4,042,912  8/1977  Bachman et al. ................... 395/600
5,307,486  4/1994  Nakamigawa ....................... 395/600

FOREIGN PATENT DOCUMENTS 2-066645  3/1990  Japan .
3-067341  3/1991  Japan .
4-139546  5/1992  Japan .

OTHER PUBLICATIONS

Suzuki et al, "A Database Control Function for Situations where Data may Increase Rapidly", Feb. 1981, pp. 1–15 *Review of The Electrical Communication Laboratories* vol. 29 No. 1–2.

Topper, "The PC–IDMS Alliance", 1988, p. 104(15) PC Tech. Journal, V6 N3.

*Primary Examiner*—Thomas G. Black
*Assistant Examiner*—Jack M. Choules
*Attorney, Agent, or Firm*—Staas & Halsey

[57] ABSTRACT

A system for changing a logical data structure of a network type database in which an owner record is linked to member records by set-information identifying positions of the member records, the system includes a first unit for changing of a definition of a logical data structure of the network type database; and a second unit, when a member record to be linked to or linked to the owner record is added to or erased from the network type database in accordance with a changed logical data structure obtained by the first unit, for adding or erasing set-information of the added or erased member record to or from the set-pointer portion of the owner record, wherein an area of the set-pointer portion is changed in accordance with a variable-length management.

5 Claims, 16 Drawing Sheets

FIG. 3A
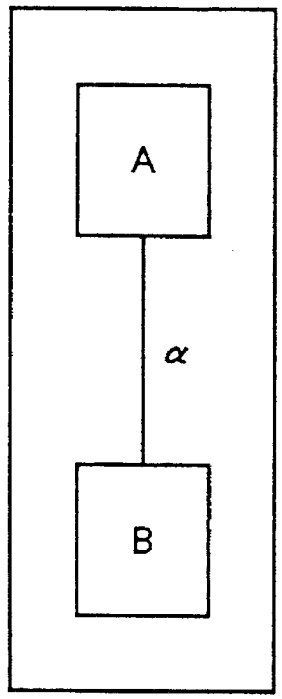
FIG. 3B
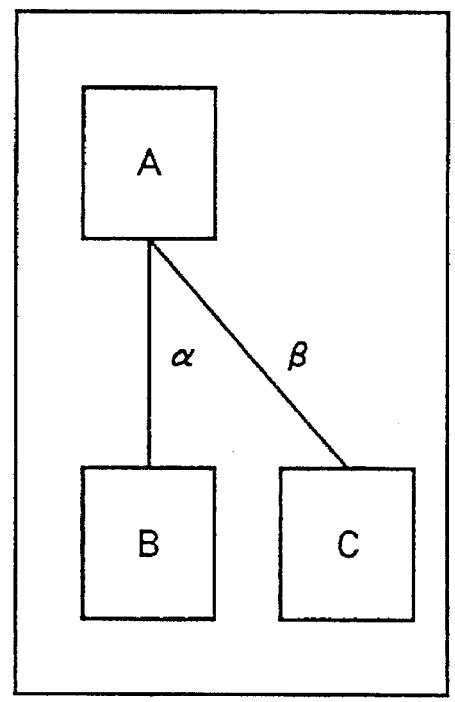

FIG. 4

| | CONTENTS OF PROCESS | CONTENTS OF RECORD OF TYPE(A) |
|---|---|---|
| (1) | STORE RECORDS $a_1$ & $a_2$ OF TYPE(A) BEFORE CHANGING LOGICAL DATA STRUCTURE | $a_1$: [CONTROL] [α SET-POINTER] [DATA] <br><br> $a_2$: [CONTROL] [α SET-POINTER] [DATA] |
| (2) | CHANGE LOGICAL DATA STRUCTURE | SAME AS ABOVE |
| (3) | LINK RECORD OF TYPE(C) TO RECORD $a_1$ BY SET-TYPE β AFTER CHANGING LOGICAL DATA STRUCTURE | $a_1$: [CONTROL] [α SET-POINTER] [β SET-POINTER] [DATA] <br><br> $a_2$: [CONTROL] [α SET-POINTER] [DATA] |
| (4) | STORE RECORD $a_3$ OF TYPE(A) AFTER CHANGING LOGICAL DATA STRUCTURE | $a_1$: [CONTROL] [α SET-POINTER] [β SET-POINTER] [DATA] <br><br> $a_2$: [CONTROL] [α SET-POINTER] [DATA] <br><br> $a_3$: [CONTROL] [α SET-POINTER] [β SET-POINTER] [DATA] |

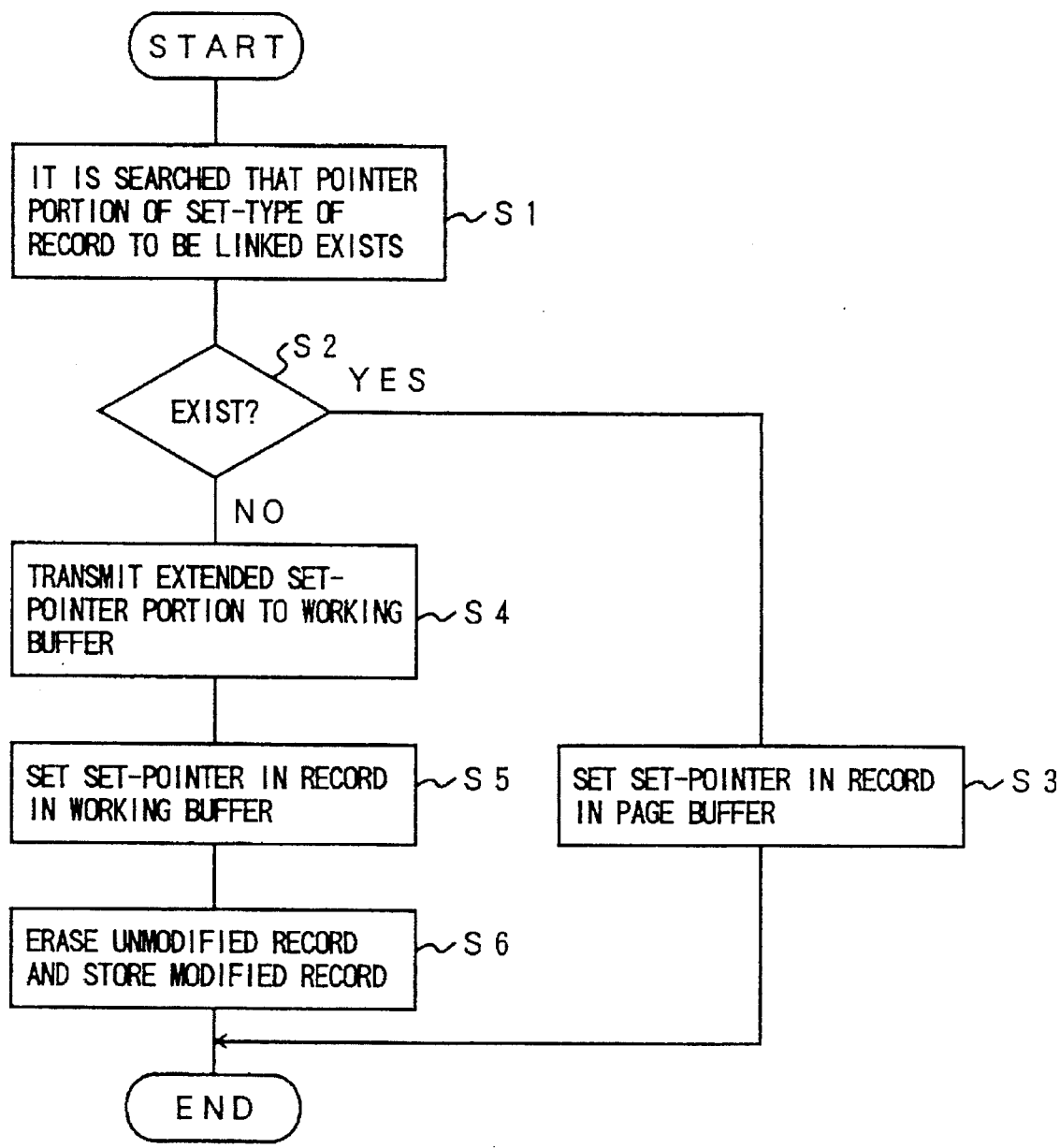

LOGICAL DATA STRUCTURE

BEFORE MODIFYING

AFTER MODIFYING

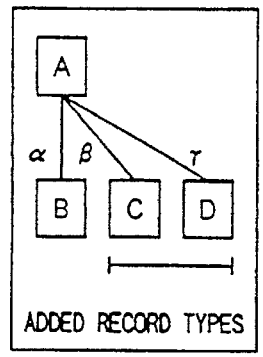
FIG. 8(a) LOGICAL DATA STRUCTURE / ADDED RECORD TYPES
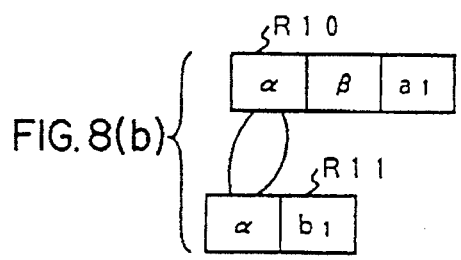
FIG. 8(b)
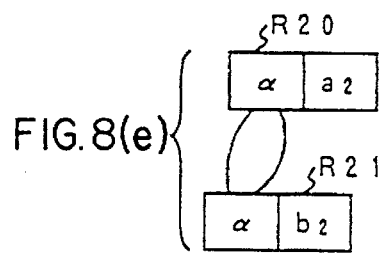
FIG. 8(e)
FIG. 8(c) STORE RECORD $c_1$ & CONNECT $\beta$ SET TO RECORD $a_1$
FIG. 8(f) STORE RECORD $c_2$ & CONNECT $\beta$ SET TO RECORD $a_2$
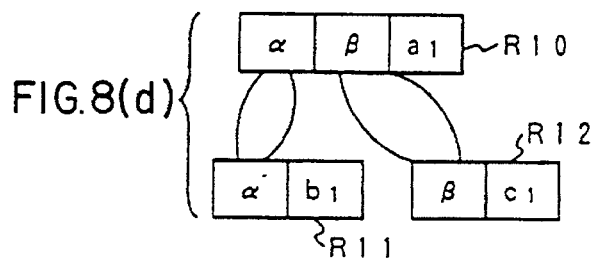
FIG. 8(d)
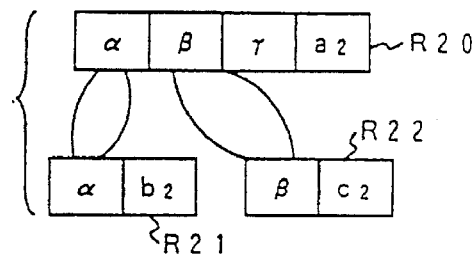
FIG. 8(g)

LOGICAL DATA STRUCTURE

FIG. 9(c) ERASE RECORD $c_1$ & SEPARATE $\beta$ SET FROM RECORD $a_1$

LOGICAL DATA STRUCTURE

PAGE BEFORE MODIFYING

PAGE AFTER MODIFYING

ANOTHER PAGE

MOVING

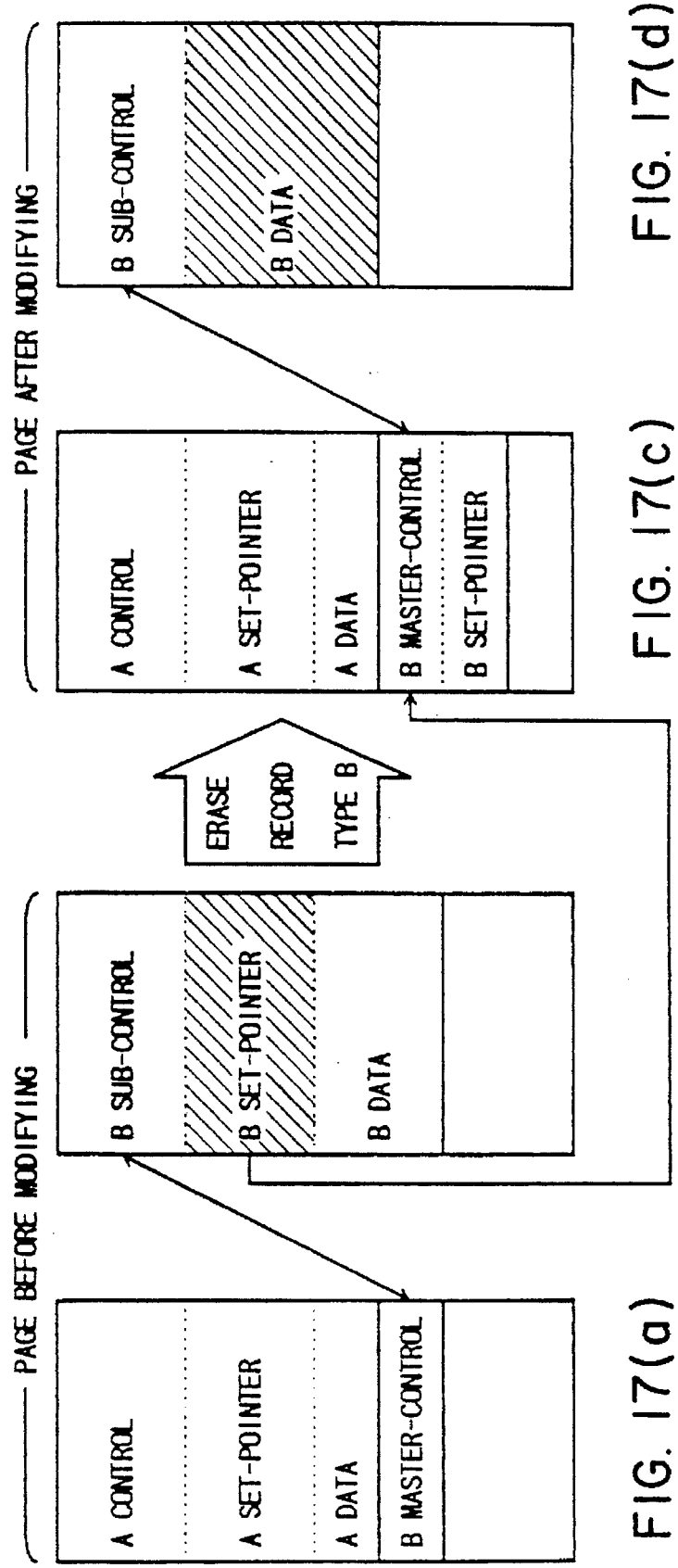

SYSTEM FOR DYNAMICALLY CHANGING LOGICAL DATA STRUCTURE OF DATABASE

This application is a continuation, of application Ser. No. 08/128,147, filed Sep. 29, 1993, now abandoned.

BACKGROUND OF THE INVENTION (1) Field of the Invention

The present invention relates to a system for dynamically changing a logical data structure of a database.

Use of a database in various services has increased. An on-line system by which a large amount of data in the database is updated and managed has become more popular. For example, a database for a large number of accounts of customers in banking service, a database for personal management in various corporations, a database for stock management of parts and products in manufacturing industries, a database for sales/stock management of commodities in services and sales, and the like, have been used.

There is a type of database among various databases as described above in which a record (referred to as an owner record) is related to other records (each of them is referred to as a member record) in a network structure (including a hierarchy structure and a tree structure). This type of database is referred to as a network type database, and has been applied to various databases. In the network type database, data representing each member record related to an owner record has been managed in an area having a fixed length.

(2) Description of the Related Art

FIG. 1 shows an example of a process for changing a logical structure of the conventional network type database.

Referring to FIG. 1, a logical data structure (1) of an original database is defined. This database is the network type database, and has records classified into two types of records: an owner record and a member record. Owner-member gets are formed among the records, and an owner-member relationship may be defined between arbitrary records. In the logical data structure (1) of the network type data base, a record type B and a record type C each of which is defined as the member record type are linked to a record type A which is defined as the owner record type in the owner-member relationship (similar to the tree structure). This type of database is physically stored, for example, in a storage unit such as a DASD (Direct Access Storage Device: e.g. a magnetic disk device). The database having the logical data structure (1) is stored in the storage unit with a physical data structure as shown in FIG. 1(a).

In the case (a), respective records (a record having data a1, a record having data a2, . . . ) which belong to the record type A defined as the owner record type have set-pointers indicated by hatching. Each of the set-pointers identifies a position of each of records belonging to the record type B and/or the record type C. That is, a record having data a1 (this record is referred to as a record a1 and the same in the other case) have a set-pointer $\alpha$ of a member record b1 and a set-pointer $\beta$ of a member record c2 added as control data to the leading portion thereof. The set-pointers $\alpha$ and $\beta$ are generally named as set-information, and the set-pointers $\alpha$ and $\beta$ are respectively referred to as an $\alpha$ set and a $\beta$ set. The set-information ($\alpha, \beta$) included in the record a1 belonging to the record type A is managed in an area having a fixed length, set information for the other records a2, a3 etc. are managed in areas the same as that for the record a1. The respective records b1 and c1 are also provided with control data as shown by hatching.

Conventionally, in a case where a record type D is added to the logical data structure (1) shown in FIG. 1 so that the logical data structure is changed (or extended), the following process is performed conventionally.

The record type D is additionally defined in the logical data structure as shown in (2) so that the logical data structure (1) is changed to a new logical data structure (3). After the new logical data structure is defined, an operation for changing the physical structure of the database is carried out. In this case, since the set-information provided as the control data in respective owner records is managed in the area having the fixed length, it is impossible to extend the database without changing the area for the current database.

Thus, a backup is made of all of the records in the database stored in the storage unit as shown by (a), so that the data in all the records in the database is stored in a backup storage medium (e) such as a magnetic tape. The logical data structure is then changed as indicated by (c), so that the new logical data structure as shown by (3) is determined. After this, all the records are restored in the storage unit such as the DASD as indicated by (d). At this time, a process for adding record D information (including $\Gamma$ set-information) is carried out.

As a result, a storage area of data d1 belonging to a record type D is provided in the database as shown by (f), a pointer $\Gamma$ a pointer (a $\Gamma$ set indicating the storage area of the data d1 is added to the control data of the record a1, and a reconstitution process of the database is carried out. The above process is carried out with respect to all the records a1, a2, a3, . . . included in the database shown by (a). In the above process, since each of the record pointers $\alpha$, $\beta$ and the like has fixed length, an area of each of the records belonging to the owner record type A must be extended to add the new record pointer ($\Gamma$) thereto. The extension of the area for the record pointer in one record affects storage areas of all the succeeding records (a2, a3, . . . ). Thus, the reconstitution process for all the records is needed.

As has been described, in a case where the logical data structure of the conventional network type database, the backup of all the records is made, and all the backup records are then restored in the storage unit. When all the backup records are restored, the set-information of the new record type D is added to each of the owner records.

However, in a case where the above the reconstitution process is carried out in the system of the database having a large amount of data of the owner records, a large capacity of the backup storage medium is needed, further the long process time is required for the reconstitution process.

For example, in a case of a database used to for manage accounts of customers in a bank, record type A, record type B, and record type C are respectively assigned to names of customers, ordinary deposit accounts and fixed deposit accounts. In this case, the database may be provided with records, shown by (a) in FIG. 1, for millions of customers if the scale of a bank is large. When the logical data structure of such a database is changed as shown by (3) in FIG. 1 to provide a new type of account in the database, a large amount of magnetic tape used as the backup storage medium is needed, and the reconstitution process in which the set-information having the fixed length must be changed takes a large process time, for example, a few hours in a small scale bank, and a few days in a large scale bank.

Thus, to change the logical data structure of the database, a banking service must be interrupted. That is, in a case where the database is used in the on-line banking service, a period of time for which the database can be changed is restricted. The same problem occurs in the large scale database for personal management, the data base for stock management of parts, and other databases.

SUMMARY OF THE INVENTION

Accordingly, a general object of the present invention is to provide a novel and useful system for changing the logical structure of a database in which the disadvantages of the aforementioned prior art are eliminated.

The specific object of the present invention is to provide a system in which a period of time for which a service using a database is interrupted by the changing of the logical data structure of the database can be decreased.

The above objects of the present invention are achieved by a system for changing a logical data structure of a network type database in which an owner record is linked to member records by set-information identifying positions of the member records, the owner record having a set-pointer portion for storing the set-information, a control portion for storing control data and a data portion for storing. The system of the present invention comprises a first unit changing a definition of a logical data structure of the network type database, and a second unit, when a member record to be linked to or linked to the owner record is added to or erased from the network type database in accordance with a changed logical data structure obtained by the first unit, for adding or erasing set-information of the added or erased member record to or from the set-pointer portion of the owner record, wherein an area of the set-pointer portion is changed in accordance with a variable-length management.

According to the present invention, in a case where the logical data structure of the network database is changed, the definition of the logical data structure may be changed singly. Thus, a time for which the service is interrupted by the changing of the logical data structure can be decreased. In addition, only when a member record is actually added to or erased from the database, the area of the set-pointer portion is extended or reduced. Thus, it is not needed to reconstitute the whole database at once. That is, it is not need to make a backup of all the records of the database in the backup storage medium.

Additional objects, features and advantages of the present invention will become apparent from the following detailed description when read in conjunction with the accompanying drawings.

BRIEF DESCRIPTION OF THE DRAWINGS

FIG. 3A is a diagram illustrating an example of the logical data structure of the database.

FIG. 3B is a diagram illustrating an example of a changed logical data structure of the database.

FIG. 4 is a table illustrating a process executed in a case where the logical data structure of the database is extended.

FIG. 5 is a flow chart illustrating a process for linking set-pointers.

FIGS. 8(a), (b), (c), (d), (e), (f) and (g) are diagrams illustrating an example of modifying of records linked by a storage process.

FIGS. 17(a), (b), (c) and (d) are diagrams illustrating an example of a case where a normal record is not made by modifying of a record.

DESCRIPTION OF THE PREFERRED EMBODIMENT

A description will now be given, with reference to FIG. 2, of an essential constitution of a system for changing the logical data structure of a data base.

Figure 1:
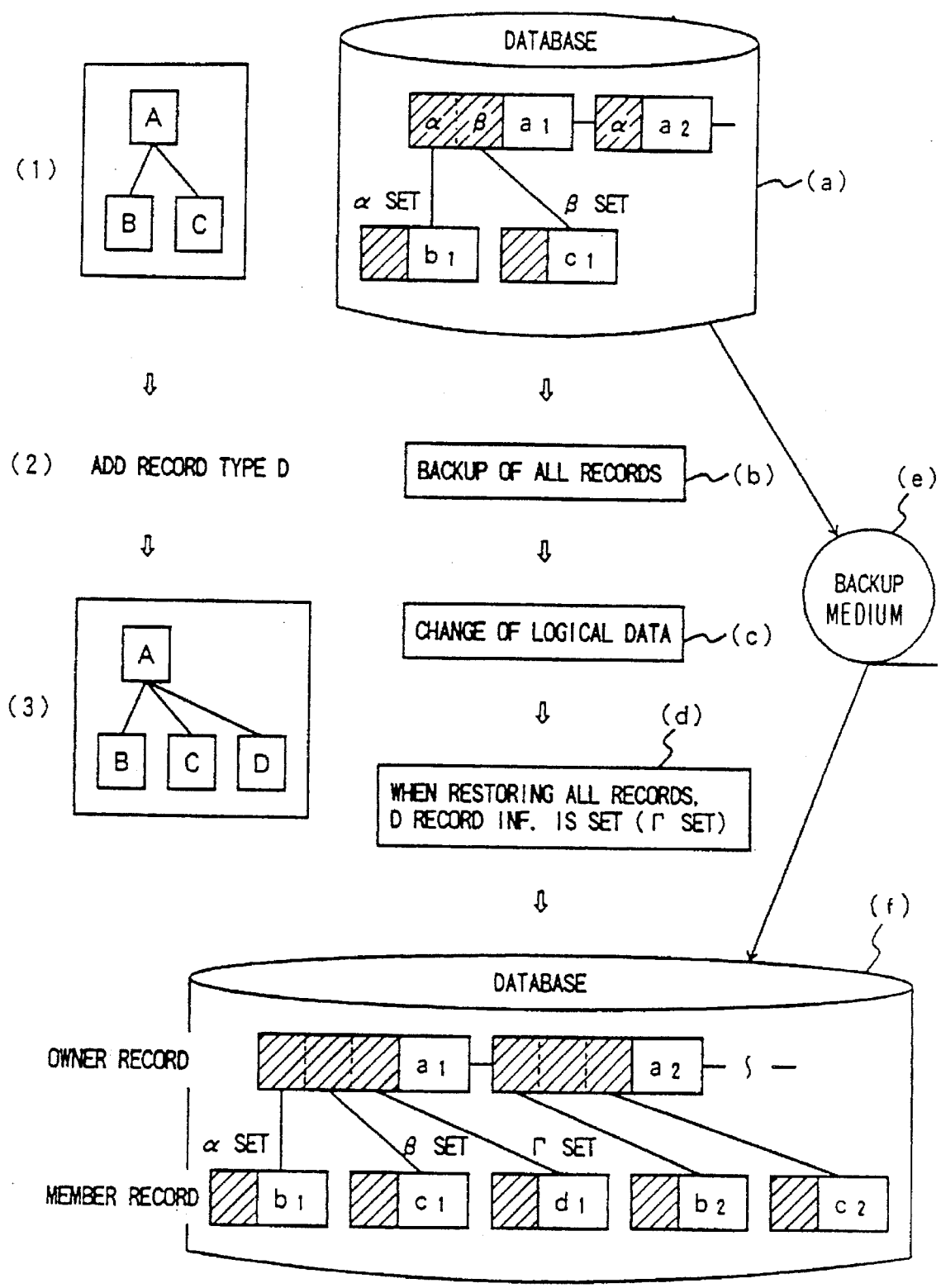
FIG. 1 is a diagram illustrating a conventional process for changing the logical structure of a database.
Figure 2:
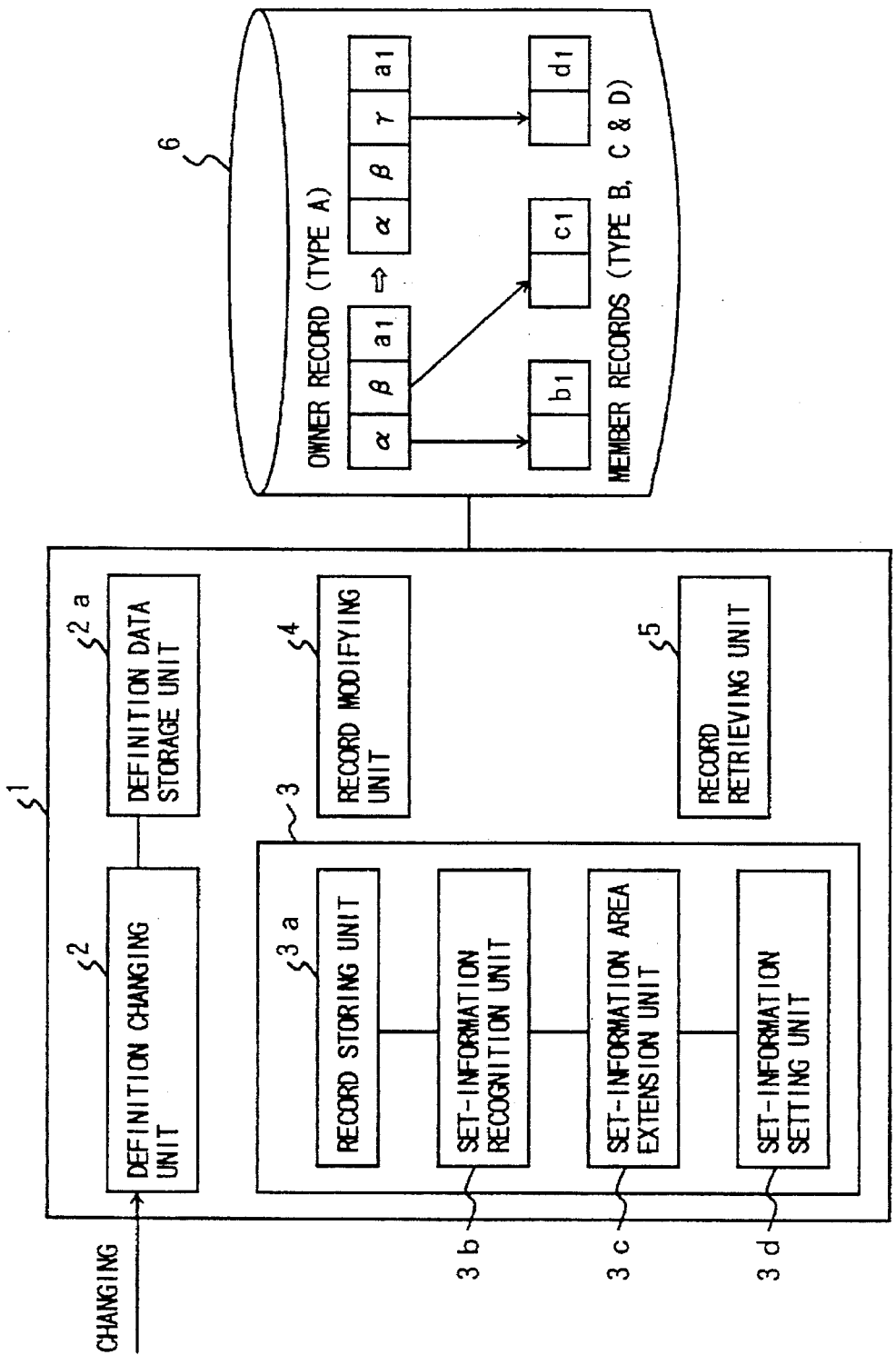
FIG. 2 is a block diagram illustrating a system for changing the logical data structure of a database according to the present invention.

Referring to FIG. 2, a database processing apparatus 1 is connected to a database storage device 6. The database processing apparatus 1 has a definition changing unit 2, a record storage processing unit 3, and a record modifying unit 4. The definition changing unit 2 is connected to a definition data storage unit 2a, and changes definition of the logical data structure of the database. The record storage processing unit 3 has a record storing unit 3a, a set-information recognition unit 3b, a set-information area extension unit 3c and a set-information setting unit 3d.

In the above system, set-information used to link owner records and member records in a network type database is dynamically managed. That is, even if it is requested that the logical structure of the database is changed (extended), the physical altering of the database is not performed until a request for storing (erasing) a record of a new record type into the database actually occurs. In response to the request for storing a record of the new record type into the database, the set-information identifying the new record is added to each of records to be linked to the new record in accordance with a variable-length management.

When a request occurs for changing the logical data structure so as to add a new record type, the definition changing unit 2 sets definition data of a changed logical data structure in the definition data storage unit 2a. In a case where, due to the changing of the logical data structure, a new record type is added to the logical data structure, the process is performed as follows.

Even if the definition data of the logical data structure is changed by the definition changing unit 2, the record storage processing unit 3 is not activated. When the request for storing a record corresponding to the added new record type into the database actually occurs, the record storage processing unit 3 is activated. That is, in the activated record storage processing unit 3, the record storing unit 3a stores the record corresponding to the added new record type into the database storage unit 6, and the set-information recognition unit 3b recognizes, based on the contents in the database storage unit 6, the set-information of records (owner records) to be linked to the record corresponding to the added new record type.

In a case shown in FIG. 2, a record (an owner record) a1 and member records b1 and c1 linked to the record a1 are physically stored in the database in the database storage unit 6 so as to be correspondent with the logical structure having the owner record type A and the member record types B and C linked to the owner record type A. The set α including the set-pointer b1 and the set β including the set-pointer c1 are added as the set-information to the record a1. When, after the logical data structure is changed so that the new record D type is added thereto, a request occurs for storing a member record d1, corresponding to the new record type D, to be linked to the owner record a1, the record storing unit 3a stores the owner record d1 into the database storage unit 6.

Next, when the set-information recognition unit 3b recognizes the set α-information and β of the record a1 to be linked to the new record d1 so that it is determined that the set-information corresponding to the new record type D is not included in the record a1, the set-information area extension unit 3c extends an area of the record a1 on which area the set-information is to be stored so that the new set-information (a pointer portion of the member record d1) can be stored. In this case, the set-information is managed in the variable-length form. If the record a1 has not enough area to set the set-information of the new record, the record a1 may be divided. After this, the set-information setting unit 3d sets the set-information (set γ) of the added member record d1 on the extended area on which the set-information is to be set. If it is determined by the set-information recognition unit 3b that there has been an area for set-information corresponding to a record requested to be stored, only a pointer corresponding to the record requested to be stored is set to the area but the area for the set-information is not extended.

As has been described above, every time the request for storing a record actually occurs, the record storage processing unit 3 dynamically changes (extends) the logical data structure. On the other hand, when the request for storing a record other than a record belonging to an added new record type occurs, the area for the set-information is not extended. Thus, it is not necessary to make a backup of all the records or to add areas for the set-information to respective records belonging to the owner record type.

In addition, the record modifying unit 4 modifies the data of each record. The record retrieving unit 5 retrieves a record belonging to an assigned record type. When the set-information areas of respective records are extended in the record storing process, record modifying process, and the record erasing process, a dividing process for dividing a record into two parts so as to store the record in two areas, a combination process for combining divided two parts into a single record, and the like are executed.

A description will now be given, with reference to FIGS. 3A, 3B and 4, of a process for extending the logical data structure of the database.

FIG. 3A shows a logical data structure to be changed, and FIG. 3B shows a changed logical data structure. That is, in the logical data structure to be changed shown in FIG. 3A, a record type A is the owner record type, a record type B is the member record type, and an α set indicates a storing position of the record type B. In the changed logical data structure shown in FIG. 3B, a record type C is linked to the record type A existing in the logical data structure to be changed, and a β set indicates a storing position of the record type C.

FIG. 4 shows a process for storing a record so that the logical data structure is extended. Referring to FIG. 4, in the left column, (1) to (4) indicate steps of the process, in the center column, contents in the respective steps (1) to (4) are indicated, and in the right column, contents of the record belonging to the record type A (the owner record type) in the respective steps (1) to (4) are indicated.

First, in step (1), before the logical data structure is changed, records a1 and a2 belonging to the record type A are stored in the data base. Each of the records a1 and a2 has a control portion, an α set-pointer portion (corresponding to the set-information indicated in FIG. 2) and a data portion (storing data a1 and a2). In the step (1), the logical data structure is defined as shown in FIG. 3A. After this, in response to input of a program instruction, the logical data structure is changed in step (2). As a result of the changing of the logical data structure, the logical data structure is defined as shown in FIG. 3B. At this time, the contents of the record belonging to the record type A are not changed.

Then, when a new record belonging to record type C to be connected to the record a1 is supplied after the logical data structure has been changed, the new record is stored in the database under a condition in which the new record is linked to the record a1 by the set-type β, in step (3). As a result, the record a1 is formed of the control portion, α the set-pointer portion, a β set-pointer portion and the data portion. At this time, the contents of the record a2 are not changed.

Next, when a request for storing a new record a3 belonging to the record type A occurs, the record a3 (the owner record) is stored in the database in step (4). In this case, as the record a3 is generated after the logical data structure has been changed, the new record a3 is formed of the control portion, the α set-pointer portion, the β set-pointer portion and the data portion based on the logical data structure changed as shown in FIG. 3B. A member record (a record c3 not shown in FIG. 4) belonging to the record type C to be linked to the new record a3 may not exist in the database. In this case, the β set-pointer portion has a value, for example, of all bits "0" indicating an empty state.

In the above step (3) for storing a new record, connection of the set-pointer is performed to link the new record belonging to the record type added to the logical data structure to an owner record previously existing in the database. A detailed description will now be given of a process for performing the connection of the set-pointer.

FIG. 5 shows a flow chart of a process for performing the connection of the set-pointer.

This process is executed under a condition in which the contents of the record (the owner record) from the database is stored in a page buffer (shown in FIGS. 6(a)–(c) and 7(a)–(f)) a main memory, a working buffer (shown in FIGS. 7(a)–(f)) is used as a temporarily working area to extend the pointer portion.

Referring to FIG. 5, in step S1, the set-pointer portion of a record stored in the page buffer is searched, and it is then determined, in step S2, whether or not a pointer portion, corresponding to the new record, to be connected to the set-pointer portion exists in the set-pointer portion of the record in the page buffer. If the pointer portion exists, a set-pointer of the new record is set, in step S3, in the set-pointer portion of the record in the page buffer. On the other hand, if the pointer portion does not exist, the set-pointer portion of the record in the page buffer is extended, and the record in the page buffer is transmitted to the working buffer in step S4. The set-pointer of the new record to be linked to the record in the working buffer is set in the set-pointer portion of the record in the working buffer in step S5. The record stored in the page buffer is erased therefrom and the record modified in the working buffer is stored in the page buffer.

Figure 6C:
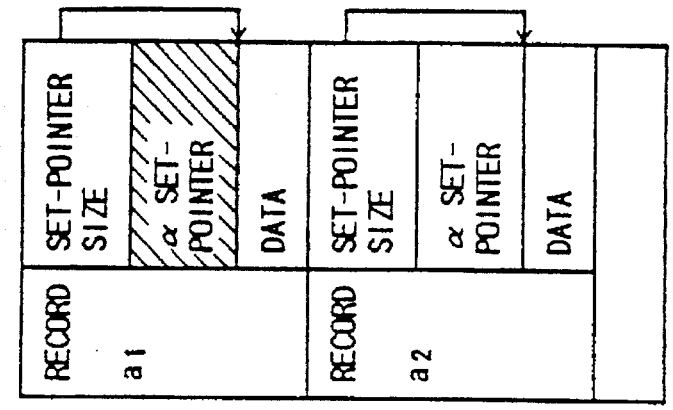
FIGS. 6(a) and (c) are diagrams illustrating a process for modifying records in a case where set-pointers to be linked exist.
Figure 6B:
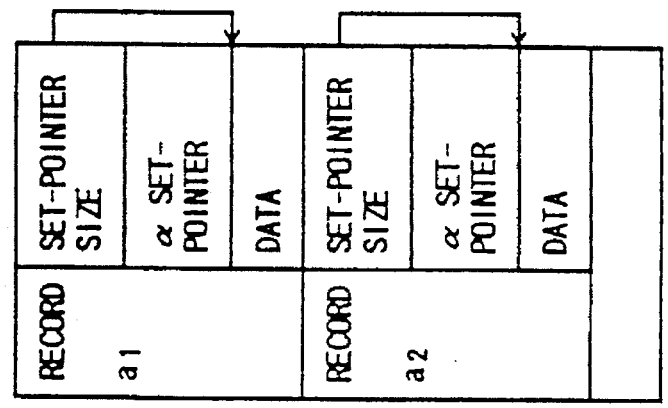
Figure 6A:
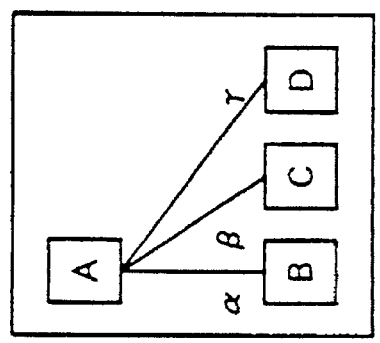

FIGS. 6(a)–(c) and 7(a)–(f) show concrete examples of the process for performing the connection of the set-pointer. If the pointer portion of the new record exists in the set-pointer portion of the record, the process is performed as shown in FIGS. 6(a)–(c). On the other hand, if the pointer portion of the new record does not exist in the set-pointer portion of the record, the process is performed as shown FIGS. 7(a)–(f).

Referring to FIGS. 6(a)–(c), FIG. 6(a) shows the logical data structure which has been already changed, FIG. 6(b) shows the contents of the page buffer storing a record to be modified and FIG. 6(c) shows the contents of the page buffer storing the record which has been modified. Before the logical data structure is changed as shown in FIG. 6(a), the record type A was linked to the record type B, but, due to the changing of the logical data structure, new record types C and D are linked to the record type A. Before the page buffer is modified, a record a1, record a2, . . . stored in the page buffer have respective set-pointer portions indicating a linkage to a record belonging to the record type B, as shown in FIG. 6(b).

In a case where an α set is connected to the record a1 shown in FIG. 6(b) (substantial data is not set in the α set-pointer portion before the page buffer is modified), a pointer value (indicating, for example, a record b1 belonging to the record type B) is set in the α set-pointer portion of the record a1, so that the page buffer is modified. After the page buffer is modified, the page buffer is formed as shown in FIG. 6(c). Referring to FIG. 6(c), even if the logical data structure is changed, the set-pointer portion of the record other than a record belonging to the added record types C and D is not extended.

Figure 7A:
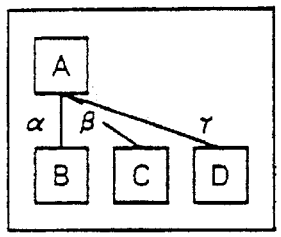
FIGS. 7(b), (c), (d), (e) and (f) are diagrams illustrating a process for modifying records in a case where set-pointers to be linked do not exist.
Figures 7B, 7C, 7D:
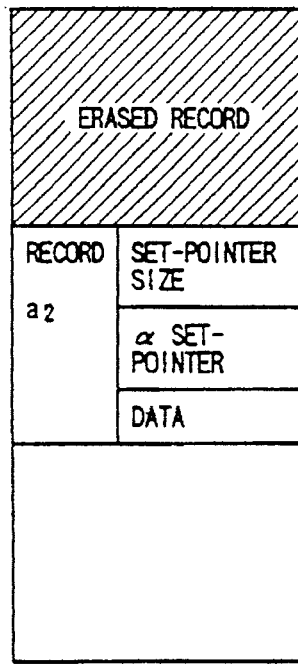

FIG. 7(a)–(f), the logical data structure having the record type A and record type B, both of which are linked, is changed to that as shown in FIG. 7(a). A request for linking a record c1 belonging to the record type C to the record a1 occurs under a condition in which the page buffer before being modified has the contents as shown in FIG. 7(b). In this case, a modifying process including a process for extending the set-pointer portion of the record a1 is executed in accordance with steps (1) to (4).

Figure 7E:
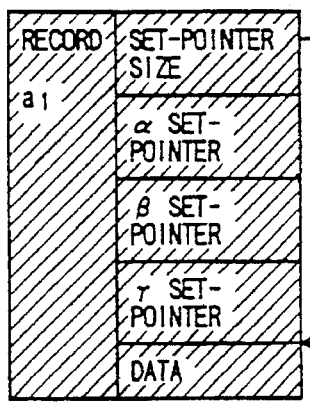

In step (1), the record a1 set in the page buffer shown in FIG. 7(b) is transmitted to the working buffer shown in FIG. 7(e). At this time, the format of the record a1 is changed so that a β set-pointer portion and a Γ set-pointer portion are added thereto.

Figure 7F:
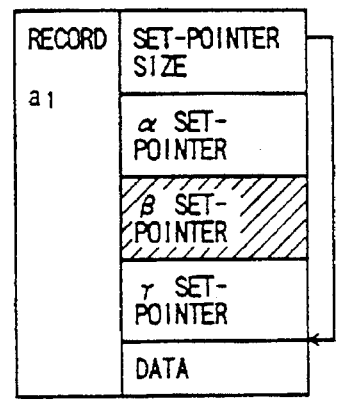

In step (2), on the working buffer, a pointer value (a β set-pointer value) indicating a record c1 belonging to the record type C to be linked to the record a1 is set in the B set-pointer portion as shown in FIG. 7(f).

In step (3), the record a1 prior to modifying is erased from the page buffer as shown in FIG. 7(c).

In step (4), the modified record a1 on the wording buffer is returned to the page buffer as shown in FIG. 7(d). If there is not enough area to store the modified record a1, the modified record a1 is divided into two parts to be stored in different pages.

FIGS. 8(a)–(g) show an example of modifying of records linked by the storing process.

In this example, the owner and member records are linked to each other by the set-pointers connected as shown in FIGS. 6(a)–(c) and 7(a)–(f). The logical data structure having the added record types C and D is shown in FIG. 8(a). As shown in FIG. 8(b), a record R11 (the record b1) belonging to the record type B is liked to a record R10 (the record a1) belonging to the record type A which record R10 is to be modified. The set-pointer portion of the record R10 has the α set and the β set.

A new record R12 (the record c1) belonging to the record type C is stored in the database, and a request for linking the new record R12 to the record R10 by the β set occurs as shown in FIG. 8(c). In this case, a pointer indicating the new record R12 is set in the β set in the set-pointer portion of the record R10 as shown in FIG. 8(d), but a set-pointer α corresponding to the added record type D is not added to the set-pointer portion of the record R10.

In another case, the set-pointer portion of the record R20 (the record a2) has only the γ set, and a record R22 (the record b2) belonging to the record type B are linked by the α set, as shown in FIG. 8(e). A new record R22 (the record c2) belonging to the record type C is then stored in the database, and a request for linking the new record R22 to the record R20 by the β set as shown in FIG. 8(f). In this case, since the set-pointer portion of the record R20 does not have the β set, the set-pointers β and γ are added to the set-pointer portion of the record R20 as shown in FIG. 8(g).

In the data modifying process, even if a record to be modified and a record having a set-pointer to be modified by the modification of the record have no set-pointer portion, the set-pointer portion is not added to the records. The data modifying process is executed as in a case shown in FIGS. 8(b), (c) and (d). That is, in a case where a record to be modified is the member record, the owner record has a set-pointer portion corresponding to the record to be modified. Thus, only the contents of the set-pointer portion of the owner record may be modified.

The record erasing process is executed as shown in FIGS. 9(a)–(d).

Figure 9A:
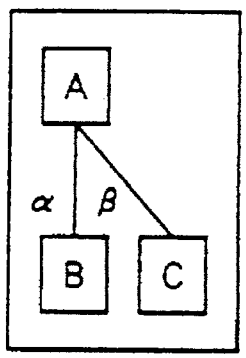
FIGS. 9(a), (b), (c) and (d) are diagrams illustrating a process for erasing a record from the database.
Figure 9B:
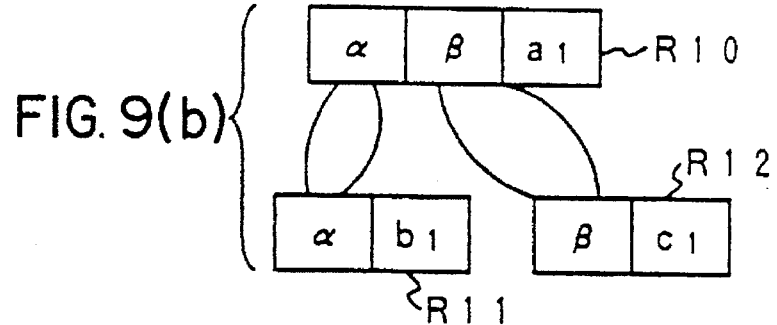
Figure 9D:
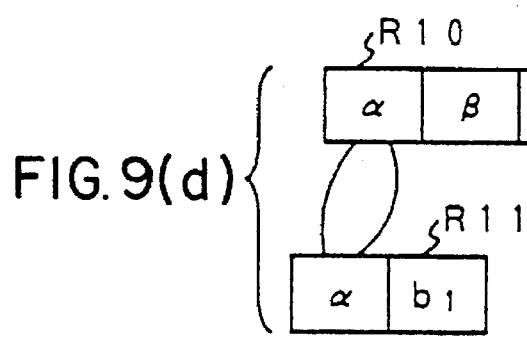

In a case shown in FIGS. 9(a)–(d), the record type C is erased under a condition in which the logical data structure is defined as shown in FIG. 9(a). In this case, a record from which the set-pointer is disconnected by the erasing process is a record belonging to the record type A. Before executing the erasing process, a record R11 (the record b1) and a record R12 (the record c1) are linked to a record R10 belonging to the record type A by set-pointers α and β set in the set-pointer portion of the record R11. When the erasing process for erasing the record R12 belonging to the record type C from the structure shown in FIG. 9(b) is executed as shown in FIG. 9(c), the record R12 (the record c1) is erased from the database, and the set-pointer β is disconnected from the record R10. As a result, only the record R11 belonging to the record type B is linked to the record R10 by the set-pointer α, as shown in FIG. 9(d).

Figure 10A:
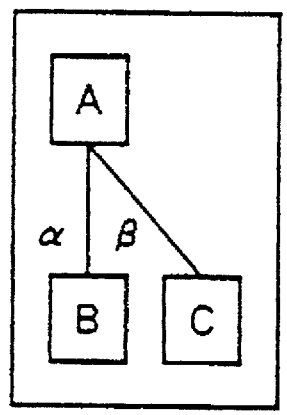
FIGS. 10(a) and (b) are diagrams illustrating an example of a set retrieving process.

The set retrieval process for retrieving a record is executed as shown in FIGS. 10(a) and (b).

Figure 10B:
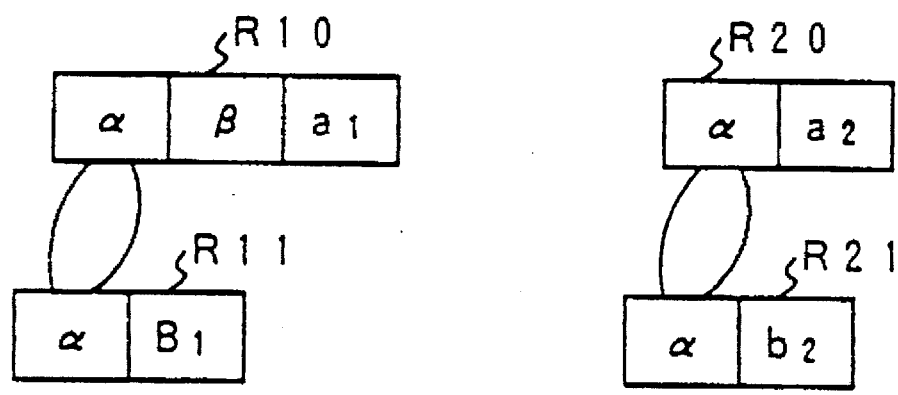

In this example, a record belonging to the record type C is retrieved under a condition in which the logical data structure is defined as shown in FIG. 10(a). The set-pointer portion β of the record R10 shown in FIG. 10(b) is searched.

However, effective values are not set in the set-pointer portion β of the record R10, so that a set-pointer value indicating a record belonging to the record type C is not detected. Thus, the record belonging to the record type C is not retrieved from the record R10. In addition, the set-pointer portion of a record R20 does not have the set-pointer β as shown in FIG. 10(b). Thus, a record belonging to the record type C is also not retrieved from the record R20. As has been described above, if the set-pointer portion of the owner record does not have a set-pointer identifying a record to be retrieved, the same retrieving result is obtained as in a case where there is no record linked to the owner record by a set-pointer included in the set-pointer portion of the owner record.

Figure 11:
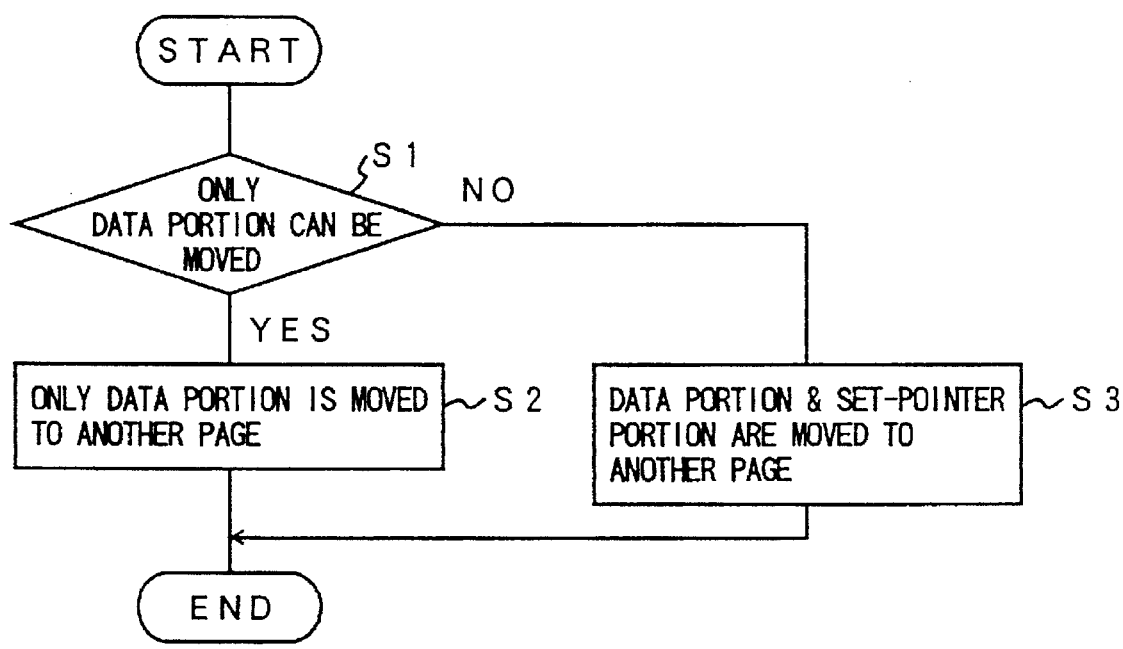
FIG. 11 is a flow chart illustrating a process for dividing a record.

A record dividing process is executing in accordance with a flow chart shown in FIG. 11.

The record dividing process is executed in a case where the set-pointer portion of an owner, record is extended due to storing of a new record to be linked to the owner record. As has been described in FIGS. 7(a)-(f), an area for the set-pointer is extended on the working buffer in step (1), and a new set-pointer is set in the extended area on the working buffer. When an area required for storing the modified record having the extended set-pointer portion is greater than the page buffer, the record dividing process is executed.

Referring to FIG. 11, in step S11, it is determined whether or not a record can be stored in the page buffer by removing only the data portion from the record. If possible, only the data portion of the record is moved to another page, step S2. If impossible, both the data portion and the set-pointer portion are moved to another page in step S3. A state where a part of the record is moved to another page is referred to a record dividing.

Figure 12A:
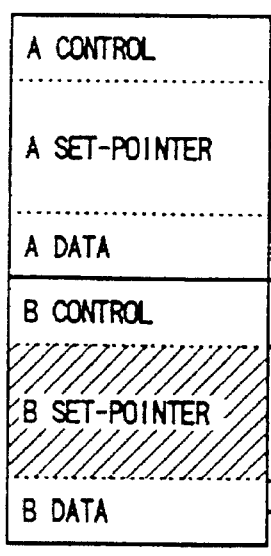
FIGS. 12(a), (b) and (c) are diagrams illustrating a example of a process for dividing a record by moving only a data portion to another page.
Figure 12B:
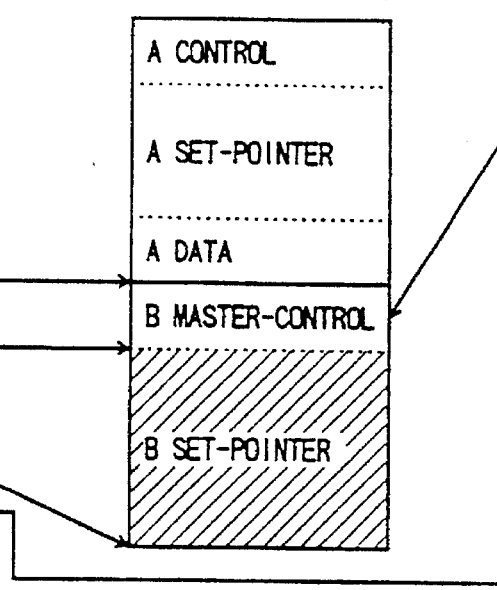
Figure 12C:
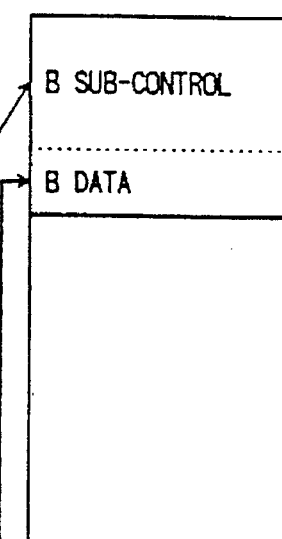

FIGS. 12(a)-(c) show the record dividing in which only the data portion of the record is moved to another page (corresponding to step S2 shown in FIG. 11). In a state where records A and B stored in the page buffer has not been modified yet as shown in FIG. 12(a), the record B to be modified has the B control portion, the B set-pointer portion and the B data portion. The B set-pointer portion of the record B is extended. When only the B data portion is not stored in a single page area of page buffer due to the extension of the B set-pointer portion, the modified record B is divided into two parts: the first part having a B control portion (a master-control portion), wherein the B set-pointer portion is stored in the original page area of the page buffer as shown in FIG. 12(b); the second part having a B control portion (a sub-control portion), wherein the B data portion is stored in the next page area of the page buffer as shown in FIG. 12(c).

Figure 13A:
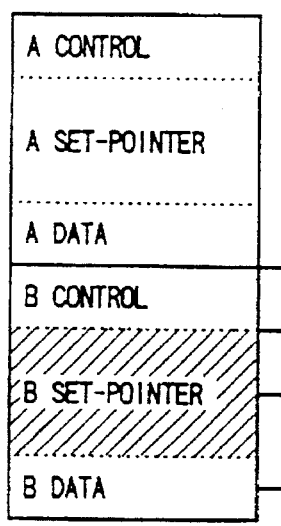
FIGS. 13(a), (b) and (c) are diagrams illustrating an example of a process for dividing a record by moving both a data portion and a set-pointer portion to another page.
Figure 13B:
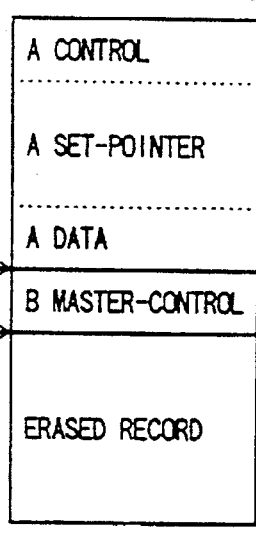
Figure 13C:
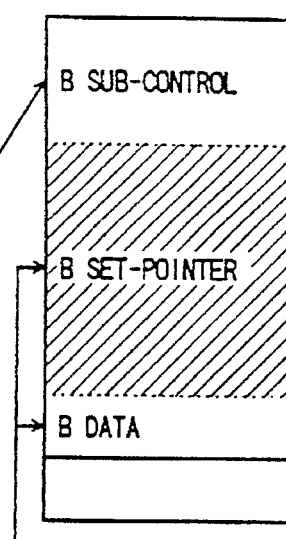

FIGS. 13(a) and (c) show the record dividing in which both the data portion and the set-pointer portion of the record are moved to another page (corresponding to step S3 shown in FIG. 11). In this case, before the record B is modified, the state shown in FIG. 13(a) is the same as that shown in FIG. 12(a). When the B set-pointer portion is extended, the record B is not stored in the original page area of the page buffer by the removing of only the B data portion. Thus, only a B control portion (the master-control portion) of the modified record B is stored in the original page area of the page buffer as shown in FIG. 13(b), and the B set-pointer portion, the B data portion and a B control portion (the sub-control portion) are stored in the next page area of the page buffer as shown in FIG. 13(c). An empty area formed on the original page area of the page buffer shown in FIG. 13(b) is defined as an erased record.

A description will now be given of a combination process for combining the first part and the second part, into which parts a record has been divided as shown in FIGS. 11 to 13(a)-(c), into as single record.

The combination of the divided parts of a record is carried out taking an opportunity for erasing and modifying a record.

In a case where a record has been erased from the page buffer, the combination process is executed as follows.

The following steps (1) and (2) are carried out with respect to all the divided parts of records in a page in which a record to be erased exists. If the record to be erased is divided into two parts in two pages, the divided parts of records in both the pages may be supplied to the combination process.

In step (1), processing occurs of each record divided into the first part having a master-control portion and the second part having a sub-control portion, the set-pointer portion, and a data portion. The first part is referred to as a master-record, and the second part is referred to as a sub-record. It is tried to move the set-pointer portion of the sub-record to the master-record so that the master-record has the master-control portion and the set-pointer portion and the sub-record has the sub-control portion and the data portion. Under a condition in which the set-pointer portion is close to the master-control portion, a record can be easily retrieved using the set-information set in the set-pointer portion. Thus, it is preferable that the set-pointer portion be included in the master-record. Thus, in step (1), only the set-pointer portion of the sub-record is moved to, the master-record.

Figures 14A, 14B, 14C, 14D:
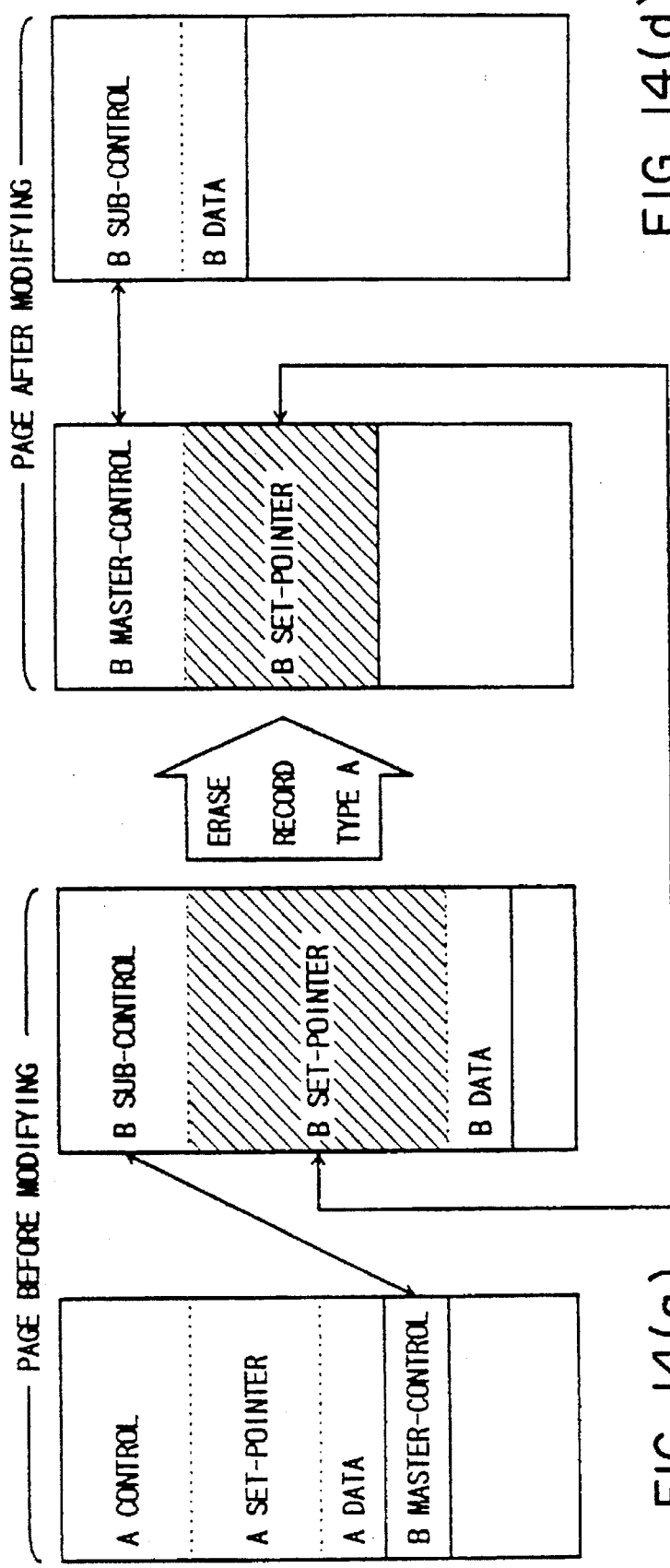
FIGS. 14(a), (b), (c) and (d) are diagrams illustrating an example of moving of the data when a record is erased.

In a case shown in FIGS. 14(a)-(d), a record B is divided into a master-record having only the B master-control portion and a sub-record having the B sub-control portion, the B set-pointer portion and the B data portion as shown in FIGS. 14(a) and (b). A record A and the master-record of the record B are stored in a first page and the sub-record of the record B is stored in, for example, a next page. When the record A is erased from the first page, an empty area is made in the first page. In this state, the B set-pointer portion of the sub-record is moved to the empty area of the first page by way of trial. If it is determined that the B set-portion can be moved to the empty area of the first page, the B master-control portion and the B set-pointer portion located in the second page are stored in an area of the first page from which the record A is erased, as shown in FIG. 14(c). The B-data portion of the sub-record of the record B is maintained stored in the second page along with the B sub-control portion as shown in FIG. 14(d).

In the above state, the record B is still divided into the master-record having the B master-control portion and the B set-pointer portion and the sub-record having the B sub-control portion and the B data portion.

In step (2), a master-record having the master-control portion and the set-pointer portion and a sub-record having the sub-control portion and the data portion are combined into an ordinary record by way of trial.

The divided records (the master-record and the sub-record) are combined into a normal record as shown in FIG. 15.

Figures 15A, 15B, 15C:
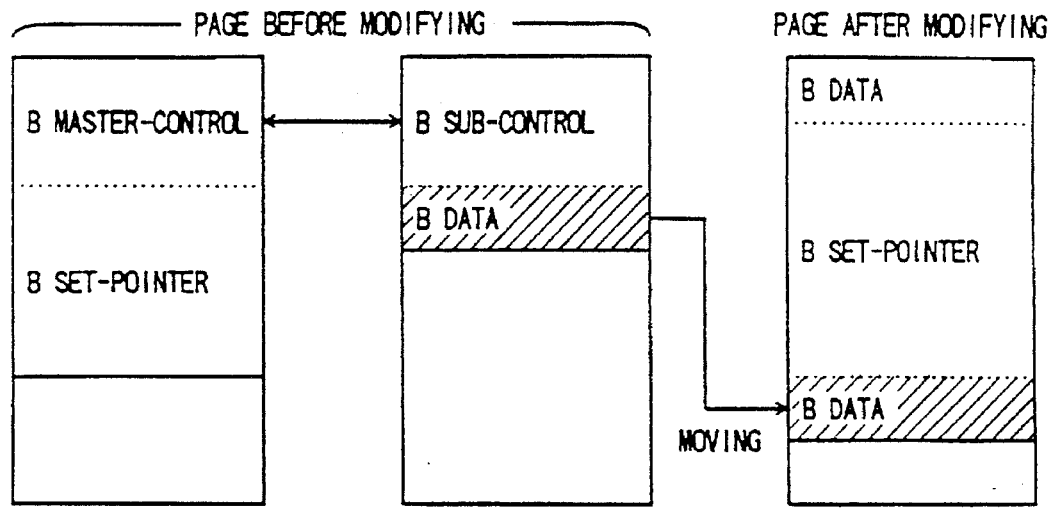
FIGS. 15(a), (b) and (c) are diagrams illustrating an example of a process for combining the divided record into a normal record.

Before a record is modified (erased), a master-record having the B master-control portion and the B set pointer-portion are stored in different page areas of the page buffer as shown in FIG. 15(a) and (b) (corresponding to FIG. 12(b) and (c)). In this state, the sub-record shown in FIG. 15(b) is combined with the master-record shown in FIG. 15(a) by way of trial. If it is determined that the sub-record can be combined with the master-record, the B data portion of the sub-record is moved to the master record, so that an ordinary record having the B control portion, the B set-pointer portion and the B data portion as shown in FIG. 15(c).

Only in a case where a record to be modified is divided in to a master-record and a sub-record, the combination process with respect to the record to be modified is carried out in the following steps (1) and (2).

In step (1), the master-record and the sub-record is combined into an ordinary record by way of trial.

If the master-record and the sub-record can not be combined into an ordinary record in step (1) in a case where the master-record has only the master-control portion, only the set-pointer portion of the sub-record is moved to the master record by way of trial.

Figures 16A, 16B, 16C:
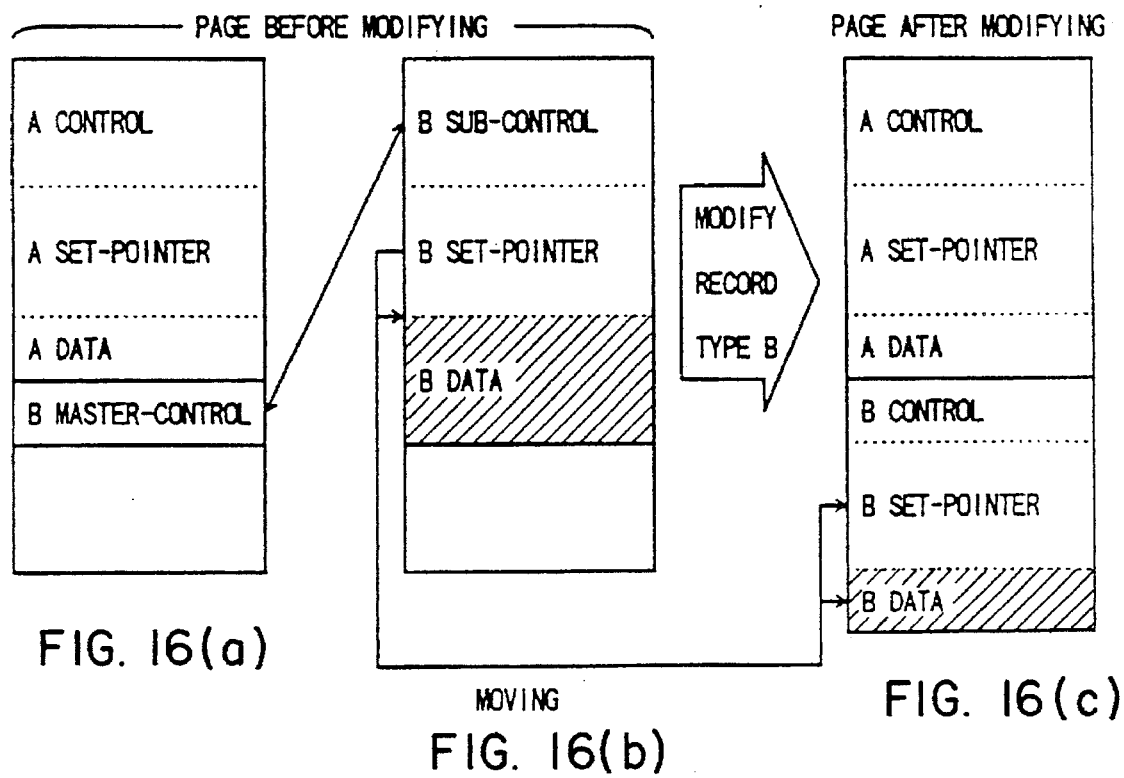
FIGS. 16(a), (b) and (c) are diagrams illustrating an example of a process for making a normal record by modifying of a record.

FIGS. 16(a)–(c) show the above step (1) concretely. Referring FIGS. 16(a)–(c), before the record B is modified, the record B is divided into the master-record having the B master-control portion shown in FIG. 16(a) and the sub-record having the B sub-control portion, the B set-pointer portion and the B data portion as shown in FIG. 16(b). If the amount of data of the record B is decreased by the modification of the record B, the B set-pointer portion and the modified B data portion can be moved to the master-record as shown in FIG. 16(c).

FIGS. 17(a)–(d) shows the above step (2) concretely. Before the record B is modified, the record B is divided into the master-record having only the B master-control portion as shown in FIG. 17(a) and the sub-record having the B sub-control portion, the B set-pointer portion and the B data portion as shown in FIG. 17(b). The master-record and the sub-record are stored in different page areas. If the B set-pointer portion of the sub-record can be moved to the master-record, the B set-pointer is moved as shown in FIGS. 17(c) and (d). In this case, the record B is divided into the master-record having the B master-control portion and the B set-pointer portion and the sub-record having the B sub-control portion and the B data portion.

The present invention is not limited to the aforementioned embodiments, and variations and modifications may be made without departing from the scope of the claimed invention.

What is claimed is:

1. A system for changing a logical data structure of a network type database, in said system owner records being linked to corresponding member records by set-information identifying positions of the member record, each of said owner records comprising a set-pointer portion storing the set-information, a control portion storing control data, and a data portion storing data, said system comprising:

first means for changing a definition of a logical data structure of said network type database; and second means for adding the set-information of an added member record to said set-pointer portion of one of said owner records corresponding to said added member record if one of the member records to be linked to said one of said owner records is added to said network type database in accordance with a changed logical data structure obtained by said first means, and for erasing the set-information of an erased member record from said set-pointer portion of said one of said owner records if one of the member records linked to said one of said owner records is erased from said network type database in accordance with the changed logical data structure obtained by said first means, wherein an area of said set-pointer portion of said one of said owner records is changed in accordance with variable-length management of one of adding and erasing the set information while maintaining said set-pointer portion of other of said owner records.

2. The system as claimed in claim 1, wherein said second means comprises:

determination means for determining whether said owner record to which the added member record is to be linked has area available in the set-pointer portion in which the set-information of the added member record is to be set;

extension means for extending an area of said set-pointer portion managed in accordance with the variable-length management when said determination means determines that said owner record does not have area available in the set-pointer portion in which the set-information of the added record is to be set; and setting means for setting the set information of the added record in the set-pointer portion of said owner record extended by the extension means.

3. The system as claimed in claim 2, further comprising:

area determination means for determining whether said owner record comprising the set-pointer portion extended by said extension means can be stored into a predetermined page area of a storage unit; and dividing means for dividing said owner record into a first part to be stored in the predetermined page area and a second part to be stored in another page area of said storage unit.

4. The system as claimed in claim 3, wherein said dividing means comprises:

dividing determination means for determining whether the first part can be stored in the predetermined page area if only the data portion of said owner record is moved to said other page area, and first control means for providing the data portion to the second portion when said dividing determination means determines that the first part can be stored in the predetermined page area if only the data portion is moved to said other page area.

5. The system as claimed in claim 3, further comprising:

combining determination means for determining whether the first part and the second part can be combined into one record in the predetermined page area when one of data in the predetermined page is modified and when data is erased from the predetermined page, and second control means for combining the first part and the second part into one record in the predetermined area when said combining determination means determines that the first part and the second part can be combined into one record.

* * * * *

UNITED STATES PATENT AND TRADEMARK OFFICE
CERTIFICATE OF CORRECTION

PATENT NO. : 5,666,527
DATED : September 9, 1997
INVENTOR(S) : TATSUMI et al.

It is certified that error appears in the above-identified patent and that said Letters Patent is hereby corrected as shown below:

Col. 2, line 27, after "set" insert --)--;
line 50, delete "for".

Col. 3, line 20, after "storing" (second occurrence) insert --data--;
line 29, change "need" to --needed--;
line 62, after "6(a)" insert --, (b)--;
line 65, change "7(b)," to --7(a), (b),--.

Col. 7, line 58, change "Γ" to --γ--.

Col. 8, line 24, change "R22" to --R21--.

Col. 9, line 18, delete ",".

Col. 10, line 59, change "FIG." to --FIGS.--;
line 60, change "15" to --15(a)-(c)--.

Signed and Sealed this

Tenth Day of February, 1998

*Attest:*

BRUCE LEHMAN

*Attesting Officer*        *Commissioner of Patents and Trademarks*